July 31, 1956  C. C. HERITAGE  2,757,148
MANUFACTURE OF THERMOSETTING CELLULOSIC PARTICLE COMPOSITIONS
Filed Oct. 21, 1955
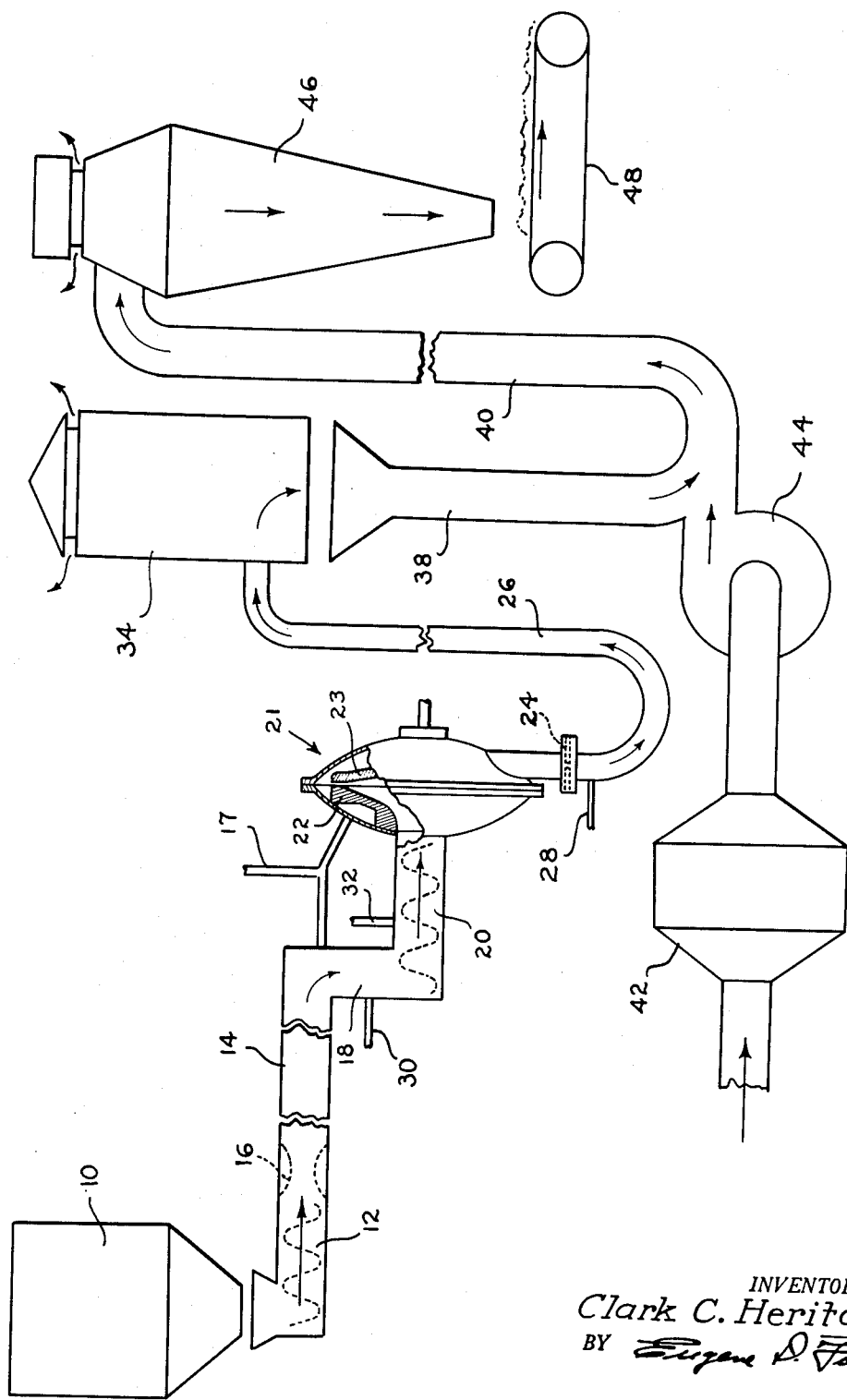
INVENTOR.
Clark C. Heritage
BY Eugene D. Farley
Atty.

United States Patent Office 2,757,148
Patented July 31, 1956

2,757,148

MANUFACTURE OF THERMOSETTING CELLULOSIC PARTICLE COMPOSITIONS

Clark C. Heritage, Tacoma, Wash., assignor, by direct and mesne assignments, of one-half to Weyerhaeuser Timber Company, Tacoma, Wash., a corporation of Washington, and one-half to Wood Conversion Company, St. Paul, Minn., a corporation of Delaware Application October 21, 1955, Serial No. 542,001

18 Claims. (Cl. 260—17.2)

This invention relates to hot-moldable mixtures of cellulosic particles and to a process of preparing hot-moldable thermosetting mixtures comprising comminuted cellulosic particles carrying thermosetting, phenol-formaldehyde resin.

The invention involves a mixture in which the resin is carried by cellulosic particles substantially all on the surfaces thereof to serve as a binder for them when thermosetting a mass of the mixture. Thus, it is distinguishable from a mass of thermosetting resin containing wood flour or fibers which on thermosetting the resin reinforce a matrix of resin. In general, mixtures containing upwardly from about 35% by weight of resin form reinforced resin matrices, while those containing less than about 35% resin form products which are basically cellulosic particles bonded to each other by resin, with interstices containing resin in amount increasing above that minimum which just coats the surfaces of the cellulose particles. The products contemplated are herein referred to as moldable or molding mixtures, thus to be distinguished from molding compounds which are those forming resin matrices.

The molding mixtures of the present invention may have a moisture content upwardly from the air-dry content of about 6% to approximately 30% by weight of the total mixture. The drier forms may be baled in bulk or packed as preforms for storage or shipment for later hot-pressing. The more moist forms are preferably used shortly after production, as in dry-felting to mats or other forms and hot-pressing them to bodies having plane or contoured surfaces. The molding mixtures with the higher content of moisture are readily moldable against a heated mold surface covered by a screen, or otherwise in molds provided with means to vent water vapor from the mold and the molding body therein.

Moldable mixtures of the class described herein are prepared by comminuting or reducing to fibrous or other particle form wood or other cellulosic raw material and specially mixing the resulting product with a thermosetting binder comprising a phenol-formaldehyde resin. In preparing such mixtures, it often is desirable to add the binder contemporaneously with the comminuting or defibering operation. Such a procedure eliminates the necessity of adding the binder in a separate step and also results in excellent distribution of the binder in the mass of the cellulosic particles. However, since in some defibering operations steam is introduced into a mechanical defibrator for the purpose of heating and softening the woody raw material, a complication is encountered in that the elevated temperature and the exposure time which are desirable for defiberizing the cellulosic material, as in the case of the Asplund machine, effect over-advancing and thermosetting of a considerable portion of the resin as set forth in my patent U. S. No. 2,553,412. The Asplund machine discharges hot moist fibers and the application of heat for drying such fibers continues the well-advanced process of advancing or advancing and setting the resin.

It also is desirable in formulating hot-moldable mixtures of the presently described class to use a thermosetting phenol-formaldehyde resin which can be processed so that it is sufficiently advanced to set or cure rapidly in the press. Use of such an advanced resin materially decreases the time required to press and thermoset the molded object and hence increases correspondingly the output of the press. The use of a quick-setting resin increases the tendency for it to be rendered ineffective by certain conventional methods of applying heat to reduce the moisture content of cellulosic particles carrying it. Although advanced fusible thermosetting resin is desirable at the final molding stage, its characteristics are such that it cannot be applied to the cellulosic particles in aqueous solution. Hence, a less advanced resin is so applied and then it is advanced in the process of drying the mixture to a suitable moisture content for hot-molding.

When such less-advanced phenol-formaldehyde resin is applied to cellulose particles in the form of an aqueous solution of it, the solution first coats then tends slowly to impregnate the ultimate fibers of the cellulosic particles. It is the binder material which lies on the surfaces of the particles which is effective to bond them together, and, therefore, impregnation is desirably to be avoided.

As set forth in my U. S. Patent No. 2,610,138, thin coats of such resin or phenol-formaldehyde solution present on cellulose fibers as a result of spraying a normally cool mist of the solution onto such fibers dispersed in normaly cool air, are most efficiently used by drying and setting the liquid coated fibers in a heated oven quickly, before the resin solution has time to penetrate the fibers to any great extent. In said patent, it is disclosed that a suitable increase in viscosity characteristics of the resin solution can effect a non-impregnating property. Such viscosity can be increased, for example, by further advancing the resin, either in manufacture, or by heating or aging after manufacture, or by varying the concentration of the adhesive solution, or by incorporating suitable thickening agents in the solution or in the production of the resin, such as polyvinyl alcohol or methyl cellulose.

Still further, in molding such cellulosic mixtures, it is often advantageous to provide a molding mixture which may be prepressed rapidly with heat and initially bonded to self-sustaining forms with retention of flowing and thermosetting properties. Such forms then may be handled more readily and introduced into a hot press for a final pressing operation, which may be of very short duration. For this purpose, it is most desirable to use a resinous binder which fuses and partially sets in an initial preforming heat-treatment with resultant rapid bonding of the cellulosic particles during the prepressing step, with retention of the property of fusing and finally setting in a subsequent final heating step.

Thus, in this art, there exists the difficult situation in which it is desirable to introduce a rapid-curing thermosetting resin into a steam-heated defibrating mechanism. When this is done, however, the rapid curing properties of the resin and the time of exposure and the heat supplied by the defibrator, as well as by the fiber-drying apparatus coact to set the resin prematurely into an inert infusible form, which is not suited for a subsequent hot-molding operation.

Cellulosic material for molding mixtures is available in many forms, varying in constitution and in physical form. The particle form may be granular, such as sawdust, or ultimate fibers, and the latter may be lignocellulose mechanically derived from wood or other natural forms, or it may be fibers from which some of the natural constituents have been removed by digestion or extractive procedures. However, for economy in cost of preparation and for utilizing the natural constituents of lignocellulose, the preferred material is the ultimate fibers or opened-up bundles thereof containing substantially all the content of natural lignocellulose from which the fibers are derived. Representative material is the fiber produced by subjecting such natural lignocellulose to mechanical defibration in an environment of steam at an elevated temperature at which the lignin content is softened to facilitate the defibration, as in the Asplund defibrator. The time and temperature so required are detrimental to the presence of thermosetting resin in the defibrating chamber. The present invention may be carried out by combining cellulosic particles, not in but discharged from such a high-temperature environment, with an aqueous solution of thermosetting phenol-formaldehyde resin, so as to produce a dry-to-moist thermosetting molding mixture. The term dry-to-moist refers to moisture content varying upwardly to approximately 30% of the total weight.

It is the general object of the invention to provide a moldable mass of cellulosic particles with fusible thermosetting phenol-formaldehyde resin located substantially entirely on the surfaces of the particles.

It is a particular object of the invention to combine the cellulose particles and a form of resin in solution too little advanced for its final utility and to advance the resin during the process of locating it on the surface of the particles as solid fusible thermosetting resin.

Various other and ancillary objects and advantages of the invention will become apparent from the following description and explanation of the invention given in connection with the accompanying drawing in which:

The figure is a diagrammatic illustration of apparatus useful in carrying out the process.

The amount of resin for bonding the cellulosic particles may vary from a very small amount, for example about one part by weight to 100 parts by weight of oven-dry-fiber, up to but just under the critical matrix-forming amount of about 35 parts of resin to 65 parts of oven-dry fiber, the critical amount varying somewhat with numerous factors, such as the physical form of the cellulosic particles. The resin employed may be useful as binder, only to the extent that it is on the surface of the cellulosic particles, and only to the extent that is fusible and thermosetting.

The present invention involves steps to locate the resin, which by virtue of variable conditions may finally exist in one or more of the following states: (1) as resin solids deposited on the surface by chemical precipitation from its solution, (2) within the cellulosic particles as a result of the resin solution impregnating the particles, (3) on the cellulosic surface by advancement while in solution to a fusible water-insoluble stage, and (4) on the cellulosic surface as a solid residue from evaporating water from a film coat of the resin solution.

Reference is made to my co-pending application Serial Nos. 334,164 and 334,165, both filed January 30, 1953, and also to my prior application Serial No. 313,496, filed October 7, 1952 and now abandoned, of which three applications the present application is a continuation-in-part. Serial No. 334,165 is generic to Serial No. 334,164 and the present application is generic to Serial No. 334,164. In Serial No. 334,165, it is disclosed that cellulosic fibers, either derived from raw wood, or formed by defibering wood in the Asplund defibrator, have a low pH and a measurable content of acid. The aqueous solution of phenol-formaldehyde resin employed has a high pH resulting from the presence of alkali to keep the resin in solution. It is taught that the acid from the fibers will lower the pH of the resin solution and precipitate resin solids. The application describes mixing the fibers and the resin solution in the absence of suspending water, and in relative amounts to precipitate all the resin solids from solution, so that all the resin is precipitated onto the surfaces of the fibers. Thus, all the resin is efficiently located for use as binder, provided its fusibility and its thermosetting qualities are not lost in the process. One method of so mixing the fibers and the resin solution is that described in the present application, and is the subject matter of said Serial No. 334,164, the proportions being limited to effect precipitation of all the resin as solids. The present invention is generic in that the proportions are not so limited and the resin solution may be used in amount up to and over the critical point at which all the resin is precipitated by reaction lowering the pH of solution. Thus, resin may be present in process as a precipitate, as a liquid film coat with resin in solution, as resin advanced by heat from soluble to insoluble condition, and a solid residue from evaporating the aqueous solute. In the case of high usage of resin solution, the acid in the cellulose may be insufficient to reduce the pH of the resin solution to the isoelectric or precipitation point, so that the precipitated form is lacking.

Said Serial No. 334,164 describes the resin solution as fed in a liquid stream into a gaseous stream of fibers as they are conveyed in a vehicular stream environment from the low pressure side of the discharge orifice of an Asplund defibrator. The resulting gaseous stream of fiber and resin is preferably, but not necessarily, separated from the steam vehicle and then promptly transferred to and conveyed for a short time in a heated gaseous vehicle, such as air or similar gas, further to lower the moisture content of the mixture before the resin content loses its properties of fusing and thermosetting, yet with beneficial advancement of the resin. The advancement and the short time prevent appreciable impregnation where resin is present in solution on the fibers, as distinguished from being all precipitated onto the fibers.

One advantage of the process is the prompt and rapid subjection of the mixed cellulosic particles and resin solution to heat and also to heat and a dehydrating environment. Both the resin-advancing heat and the concentration of the resin solution by quick drying conditions, increase the viscosity of the solution thereby lessening its property of impregnating the particles or fibers, and, therefore, locating substantially all of it on the surface of the particles or fibers.

The present invention is generic to the application of such a resin solution to cellulosic particles followed by prompt and rapid exposure to heat and a dehydrating environment, regardless of the final state of the resulting active resin, so long as it is on the surface of the cellulosic particle, and, therefore, without the necessity that the cellulosic material contain acid to precipitate resin solids, although such acid content is advantageous and desirable.

Resin solutions vary in their time response to heat for thermosetting, and the time is longer the lower the temperature. Accordingly, the time and temperature of exposure of the mixture of cellulosic particles and resin solution to heat is predetermined by the character of the resin and also by the amount of moisture present and being removed, such loss of moisture having a cooling effect relative to the temperature of the dehydrating environment. Therefore, it is to be understood that the various conditions herein disclosed are not given as critical ones, but only as suitable ones for all the conditions and for the particular resin solution employed.

Briefly stated, this process is illustrated by mixing a gaseous stream of comminuted cellulosic material and a stream of an aqueous alkaline solution of a rapid-curing thermosetting phenol-formaldehyde resin, having a hot plate cure time of between about 2 seconds and about 30 seconds, and a formaldehyde to phenol ratio of about 1.5–3 to 1. The moisture content of the resulting initial mixture is controlled to a value of between about 35% and about 70% of the total weight, thus precluding the presence of suspending water. This permits use of a resin solution at a dilution having at least about 18% to 20% of resin solids and moist cellulose particles having from 35% to 55% of moisture content, a range readily attainable with an Asplund defibrator, and a usage of resin solids in an amount in the range from about one part to about 35 parts per 100 parts of oven-dry solids of the final mixture.

The rapid curing resinous binder to be mixed with the comminuted cellulosic material comprises a phenol-formaldehyde resinous condensation product which has been insufficiently advanced so that it may be further advanced in process without reaching the infusible stage. As defined herein, such a resin has a hot-plate cure time of between about 2 seconds and about 30 seconds, preferably between about 3 seconds and about 9 seconds, the hot-plate cure time being used in the resin art as a measure of the proximity of a given resin to the set up or infusible state. It is determined by spreading a film of the resin on a hot surface maintained by thermostatic control at a temperature of 150° C.±1° C. The film is constantly agitated until it has become non-tacky and infusible. The time which elapses between the contacting of the hot surface by the resin and the achievement of infusibility constitutes the hot-plate cure time of the resin.

In addition to having the indicated hot-plate cure time, the aqueous thermosetting resin solutions which are suitable for use in the presently described process have formaldehyde to phenol ratios of about 1.5–3 to 1, i. e., are prepared using from about 1.5 to about 3 mols of formaldehyde for each mol of phenol. In addition they may be characterized by the following approximate properties:

| | |
|---|---|
| Viscosity (cp. at 25° C.) | 250–350 |
| Specific gravity at 25°/25° C | 1.14–1.16 |
| Percent alkalinity (NaOH) | 3–4 |
| Non-volatile content (per cent) | 35–40 |

The invention may be practiced with a wide variety of cellulosic materials. Thus, it may be applied to comminuted straw, grasses, cane, bagasse, and the like as well as to the chemically prepared cellulose pulps. However, it is primarily intended for use with defiberized wood or lignocellulose and is described herein with particular reference to these raw materials. The wood or other lignocellulose may be defibered in any suitable apparatus, as for example, in the Bauer, MacMillan or Allis-Chalmers defibrators, but preferably is defibered in an Asplund defibrator as is described in detail below.

Although the mixture of cellulosic material and the solution of thermosetting resin binder may be formed in any suitable manner and in any suitable apparatus, and although it may subsequently be subjected to the herein described heat treatment in equipment of any suitable type, these operations preferably are effectuated in connection with the operation of an Asplund defibrator and are described herein with particular reference to that machine. Such apparatus is illustrated schematically in the drawing.

The invention calls for prompt and rapid subjection of the liquid-coated cellulosic particles to heat and to dehydrating conditions. When carried out on fibers discharged by the Asplund defibrator, as later described in reference to the drawing, the fibers are initially available hot, moist and in a vehicle of steam. Therefore, the resin is applied within this vehicle which provides the heat. As later explained, the particular conditions constitute this steam environment as one dehydrating with reference to the coated particles. However, it is not sufficiently dehydrating to constitute the final dehydration.

The final dehydration is carried out in a vehicle which is dehydrating to the particles being subjected to it. Such vehicle may be hot air with which the vehicular steam and its carried particles are merged, or it may be such a hot air into which the particles are transferred after separation from the steam vehicle. Such separation is described in connection with the illustrated apparatus.

In accordance with this embodiment of the invention, wood in the form of chips is introduced into bin 10. It is fed from this bin by means of a screw conveyer 12 into the horizontal, steam heated preheater 14 of the Asplund machine. The preheater has at its infeed side a constriction 16, and is fed with steam under pressure through line 17 which may also introduce steam into the defibrating chamber.

The chips after traversing the horizontal preheater pass into the vertical preheater 18 whence they are forced through the spool piece 20 into the defibrator 21. There, having been softened by the steam environment present in the apparatus, they are fed between relatively rotatable discs 22, 23 which rub them and abrade them to form a fibrous product consisting principally of ultimate fibers in the form of individual tracheids, together with a minor proportion of flexible bundles of fibers. Although the conditions of operation of the defibrator may be somewhat flexible depending upon such factors as the identity of the raw material and the properties desired in the product, illustrative conditions comprise a treatment with steam while defibering at a pressure of between about 80 and about 160 p. s. i. g. (pounds per square inch gauge) at a temperature of between about 100° C. and about 200° C. for a time of between about ½ minute and about 6 minutes. The fibrous product then is discharged from the defibrator through an orifice 24.

The discharged fiber enters a first conduit 26 at substantially the machine temperature, and at a moisture content of between about 35% and about 55% of the total weight. Since it has been forced suddenly from the defibrating region of relatively high pressure to a region of much lower pressure, there is a marked lowering of the temperature as a result of the instantaneous and therefore near adiabatic expansion of the steam, with moisture content of the mixture in part flashing into vapor. This liberated heat thus assists in partially drying the fibers.

Also, the fibers are in a condition of great turbulence and may, therefore, now be mixed effectively with the solution of thermosetting resinous binder which may be introduced in a pumped, metered feed through line 28. Other materials such as thermoplastic binders, if these are to be added, may be introduced at this point as well as at other points, as for example, in the preheater via line 30, or ahead of the defibrating discs via line 32.

The intimate moist mixture of fiber and binder liquid formed just beyond orifice 24 then passes rapidly through the elongated conduit 26 where it is cooled by the expansion of the steam as well as by radiation from the conduit, and dried to a certain extent. The acid in the fibers effects precipitation of resin solids at the interface. Suitable small proportions of resin may have all the resin so precipitated. Larger proportions may have only a portion precipitated and the remainder in solution. Still larger proportions may effect dissolution of initially precipitated solids as the result of diffusion. To a limited extent, the resin is advanced, but not disadvantageously so. The objective is to utilize part of the curing time for the initial resin solution in the processing described, while retaining the property of fusing and setting for subsequent and final processing. The dwell time within conduit 26 is determined by such factors as its dimensions and the velocity of the mixture, but when using fast-curing resins of the class described herein, it is adjusted to a value of between about one second and about 15 seconds, preferably between about 2 seconds and about 6 seconds, when the temperature of the mixture is from about 100° C. to about 200° C., preferably from about 105° C. to about 125° C.

When it is desired to separate the particles from the steam for final drying, the mixture passes from conduit 26 into steam separator 34, where additional cooling occurs, after which it enters a second conduit 38. The latter communicates with a heating chamber 40 supplied with gas which is substantially inert to the fiber-resin mixture, for example, air or other hot vapor such as nitrogen or flue gas heated, if necessary, in heater 42 and forced into the conduit by means of fan 44. The air supplied by this heater is at a temperature sufficient to raise the temperature of the mixture to a level of between about 50° C. and about 200° C., preferably between about 75° C. and about 125° C. The mixture is maintained at this temperature level within the heating chamber for a time period of between about one second and about 15 seconds, preferably between about 5 seconds and about 10 seconds, this dwell time being regulated by the dimensions of the chamber and the rate of travel of the mixture therethrough. It then may be separated from the entraining air in cyclone 46, where it is cooled rapidly to room temperature, thereby preventing further advancement of the resin. Thereafter, it is deposited on conveyer 48 for conveyance to storage or further processing.

When the volume of air supplied by the blower 44 and its temperature, are sufficient to permit combining the heated air with the steam in conduit 26, and provide a suitable dehydrating mixture at a temperature in said range from about 50° C. to 200° C., then the steam separator may be dispensed with, and the conduit 26 may be connected to the intake of blower 44 or suitably connected to inject its contents into conduit 40 for travel therein.

The passage through conduit 40 reduces the moisture content of the mixture to a level of between about 5% and about 30% and preferably to between about 10% and about 30% of the total weight. Furthermore, it advances the rapid-curing thermosetting resin to an optimum extent at which it will set rapidly upon being pressed, but without destroying its bonding and fusible qualities. Hence, the mixture may be shaped into mats or forms by any suitable technique, as for example, pneumatically in forms of the desired dimensions and configuration. The resulting felt then may be introduced into a hot-press or mold of suitable design and thermoset into a final molded article. The preferred processing is such that a preliminary preform of the mixture may be heated quickly as by blowing hot air through it to tack the particles together by resin which remains fusible and thermosetting for the final operation.

The amount of thermosetting resin to be used in the foregoing process is variable over a wide range depending upon the properties desired in the final product and the characteristics of the cellulosic raw material. In general, however, it falls in a range from about 1% of the oven-dry weight to a point short of the critical matrix-forming amount, as determined by weight of non-volatile resin substance and the dry weight of the mixture.

Where a thermoplastic resin is employed together with the thermosetting resin, it may be used in amounts of between about 2% and about 60% by weight of the total resin used, preferably in amounts of between about 5% and about 40% by weight. A variety of thermoplastic resins may be employed, suitable ones being the asphalts, the Gilsonites, the pine wood resins including extracted pine wood pitch (Vinsol), the thermoplastic natural gums such as Congo gum, the thermoplastic cellulose ethers, the thermoplastic cellulose esters, the thermoplastic polyvinyl chlorides and acetates, and the like.

The process of the present invention is further illustrated by the following example:

EXAMPLE 1

Douglas fir wood was reduced to chips and the latter introduced into an Asplund defibrator maintained at a steam pressure of between about 80 and about 160 p. s. i. g., the dwell time within the defibrator being between about ½ minute and about 6 minutes.

The fiber discharged from the machine was mixed intimately just beyond the machine orifice with a thermosetting phenol-formaldehyde resin made by condensing from about 1½ to about 3 mols formaldehyde for each mol of phenol and having a hot-plate cure time of between about 2 and about 30 seconds. The resin was provided in the form of an aqueous suspension having a viscosity at 25° C. of 250–350 cp., a specific gravity (25°/25° C.) of 1.148, an alkalinity of 3.50% expressed as NaOH, and a non-volatile content of 38.0%. Before it was used, however, it was diluted with water until it had a resin-solids content of about 20% by weight to make it more easily handled and applied. Sufficient of the diluted resin was used to incorporate about 5% of resin solids in the fibrous mixture. This amount of such resin solution permits precipitation of all the resin content on the fibers by acid in the Asplund fibers, as set forth in my said co-pending applications Serial Nos. 334,164 and 334,165, filed January 30, 1953.

The mixture then was passed through a conduit approximately 100 feet long by 4 inches in diameter, at a temperature of between about 105° C. and about 125° C. About 2 seconds were required for the material to traverse this conduit.

Next, the mixture was passed through a steam separator, the steam being vented to atmosphere, and the mixture being passed into a heating chamber in the form of an elongated conduit where it was treated with hot dry air. The temperature of the mixture in the heating conduit was elevated by this agency to a value of about 75–125° C. and the dwell time within the conduit was about 6 seconds.

As a product of the above process there was obtained a dry, fluffy, non-cohering, readily feltable fibrous product having uniformly distributed over the surfaces of the fibers, a thermosetting resin advanced to the optimum degree in that it was fusible and curable when heated in a press in a minimum time, but had not as yet been converted to the infusible condition. The product thus was applicable to felting and molding into any one of numerous selected shapes and to subsequent pressing in a hot press to form the desired molded articles.

EXAMPLE 2

Chips of Douglas fir wood are fed into an Asplund defibrator at the rate of 1675 lbs. (oven-dry weight) per hour along with 43.3 lbs. per hour of melted petrolatum, and from 70 and 110 gallons of water. The chips are defibered in the presence of steam at 120 p. s. i. g. corresponding to 177° C. and 350° F. The resulting fiber is discharged in a vehicle of steam through an orifice having a diameter of about 0.06 to 0.1 inch. The orifice discharges into a long conduit through which the fibers are conveyed in the vehicle of steam. Immediately downstream from the orifice there is introduced into the stream at the rate of 17.3 lbs. of resin solids per hour, an aqueous solution of Resin A diluted to 18.5% resin solids.

Resin A is a solution available commercially having 38% of solids (mostly resin solids). The resin is a condensation of one mol of phenol and 2 to 2.5 moles of formaldehyde. It has a hot-plate cure time at 150° C. of 9 seconds ±3 seconds. A test specimen of 100 gms. of the Resin A solution diluted to 18% solids, as used for resin supply 56 has a pH of 10.5. The diluted solution, electro-titrated with HCl solution of about 0.1 normality to lower the pH, became opaque at pH of 9.15. At pH of 8.9 the resin was completely precipitated.

The resulting fiber thus contains substantially 1% of resin solids and 2.5% of petrolatum on the oven-dry basis, is conveyed and dried as set forth in Example 1.

EXAMPLE 3

Example 2 is repeated using twice as much resin, thus giving a fiber containing substantially 2% of resin solids and 2.5% of petrolatum on the oven-dry basis.

EXAMPLES 4 AND 5

Examples 2 and 3 are repeated using a solution of Resin B which is one prepared according to Booty U. S. No. 2,462,252. This likewise is an alkaline-stabilized aqueous solution of a phenol-formaldehyde resin formed in the presence of polyvinyl alcohol, which imparts increased viscosity to the solution, thus to minimize impregnation.

The fibers resulting from Examples 2, 3, 4 and 5, and similar batches of fiber produced in the same operations but without adding resin were felted into mats and hot-pressed to boards of 64 pounds per cu. ft., as convenient forms for testing their strengths. Two such defibering runs were made producing Fiber X and Fiber Y. The boards were compared for strengths as follows:

Table 1

| Parts Resin Solids per 100 Parts Oven-Dry Fiber | Modulus of Rupture in Pounds per sq. in. ± 300 | |
|---|---|---|
| | Fiber X Resin A | Fiber Y Resin B |
| 0 (Blank) | 4,900 | 4,200 |
| 1 | 7,100 | 5,500 |
| 2 | 8,100 | 6,700 |

In the above examples, the acidity of the wood is sufficient to precipitate all the resin solids onto the surface of the fibers in accordance with the invention set forth in my copending application Serial No. 334,165. When the wood contains insufficient acid to precipitate all the resin content of the solution, dissolved resin is initially present on the surface of the fibers. This tends slowly to penetrate the fibers at a rate depending in part at least upon the viscosity of the solution. However, the presence of the so-coated fiber in a high temperature environment advances the resin so dissolved thus increasing the viscosity to counteract the tendency for impregnation.

When the alkaline resin solution is present on the fibers in an amount greatly exceeding the acid value of the fibers to precipitate all of it, its content of alkali gives the fiber-resin mixture a pH value above that of a mixture in which all of the resin content is precipitated. Where a lower pH value of the resulting fiber is desired, a buffering agent is added, such as aluminum sulfate. The action of this particular buffer to some extent may precipitate resin beyond the capacity of the wood fiber itself to do so, and the resulting aluminum hydroxide supplements any residual alum as buffer.

EXAMPLE 6

Into an Asplund defibrator having steam at 350° F. were fed at a constant rate in the following proportions: Douglas fir chips 100 parts, molten petrolatum 3 parts, and alum as $Al_2(SO_4)_3$ one part dissolved in water.

The fibers are discharged through the orifice of the defibrator into an environment of steam at a reduced pressure existing in the conveying conduit. Immediately downstream from the orifice, the alkaline resin solution as used in Example 1 is introduced in the amount to add 15 parts of resin solids to 100 parts of oven-dry fiber. With this amount of resin solution, resin remains in solution on the fibers. The high temperature to which the resin solution is thus immediately subjected in the conduit advances the resin as the coated fibers travel in the vehicular steam. The advancement results in increased viscosity with a lessened tendency of the solution to impregnate the fibers. Thus, in processing and drying as in Example 1, the resin solids remain largely on the surface of the fibers. The fibers are dried to a moisture content of 12%.

EXAMPLE 7

Douglas fir chips are defibered in the Asplund defibrator at 140 p. s. i. g. corresponding to about 361° F. and about 183° C. As the fiber is discharged from the defibering chamber, a stream of the alkaline resin solution of Example 1 is injected into the current of steam conveying the fibers. The rate of resin feed is such as to provide 17.5 parts of resin solids to 100 parts oven-dry weight of fiber. No other agents were added. The materials were processed as in Example 1 to a fluffy bulk fiber having less than 25% moisture content and having a pH of 9.5.

The resin solution employed has a pH value of approximately 10.4 and when this is reduced by adding acid turbidity appears at about pH of 9.2. As this pH is lowered by adding more acid, all the resin is precipitated at an isoelectric point of pH of 8.9. The pH of the processed fiber shows that the acid in the fibers is not sufficient to reduce the pH of the resin solution even to the turbidity point, because of the high usage of the alkaline solution. Accordingly, substantially all of the resin remains in solution on the fibers as a residual film coating, when the fibers are dried.

The dried fibers are then blown into a flat preformed felt of uniform thickness and density for hot-pressing to form a molded board. The mat is pressed to a final thickness of approximately ³⁄₃₂ inch, and to a density of 70 lbs. per cu. ft. This presents a modulus of rupture of 10,000 lbs. per square inch, this being below the potential in such content of resin, due to a low degree of felting in making the preform mat.

In hot-pressing the mat, it is observed that it presents more spring-back pressure than the corresponding mats with usage of resin in amounts less than about 7%, which latter have precipitated solids on the fibers. The added spring-back is believed to be due to the fact that the fibers have film coatings of resin thereon which offers more resistance to compression than fibers with precipitated solids.

The prompt application of heat to the mixture in a gaseous vehicle preferably effected by forming and conveying the cellulosic particles carrying resin solution in an environment of steam, functions to increase the viscosity of the resin solution by advancing resin content with retention of fusible and thermosetting properties. The increased viscosity minimizes or prevents the impregnation of the particles by resin, thus locating resin substantially all on the surface of the particles. The simultaneous dehydration effected, as described on discharge from the Asplund defibrator, increases the resin concentration in solution, likewise increasing viscosity and leading to early deposition of resin by mechanism other than chemical precipitation. Part or all of the resin in the initial solution may be precipitated chemically as resin solids on the surface of the particles when the latter contain acid, as for example, when the particles are raw wood particles or fibers made from raw wood in the Asplund defibrator. Low usages of resin may result in precipitation of all the resin. In high usage of resin, the advanced resin solution which resides on the surfaces of the particles may lead to water-insoluble resin, before it is rapidly dried to a solid residue by conveyance in the dehydrating gas, such being done before the resin loses its ability to fuse and thermoset. This incomplete advancement of the resin is not only of advantage in minimizing impregnation, but it is of great economic value in that the final advancement to thermoset condition takes less time in a hot-press, or molding operation, thus adding to production capacity of such apparatus.

From the foregoing, it will be appreciated that the invention may be carried out in numerous ways not limited to the specific illustrative examples, without departing from the spirit and scope of the invention as expressed in the appended claims.

I claim:

1. The process comprising forming a stream of moist cellulosic particles in a gaseous environment, continuously introducing into said stream an aqueous solution of thermosetting phenol-formaldehyde resin, the proportion of resin solids to the oven-dry weight of the resulting mixture being in the range upwardly from 1% to a proportion just short of the minimum matrix forming proportion, and the total amount of water from the particles and the resin solution being in the range from about 35% to 70% of the total weight, promptly conveying said mixed materials in a dehydrating gaseous environment at a temperature level between about 50° C. and about 200° C. for a time sufficiently long to heat and advance the resin and to reduce the moisture content of the material to at most 30% of the total weight, and sufficiently short to maintain the resulting resin in fusible thermosetting condition.

2. The process comprising forming a turbulent stream of moist cellulosic particles in a heated gaseous environment, continuously introducing into said stream an aqueous solution of thermosetting phenol-formaldehyde resin, the proportion of resin solids to the oven-dry weight of the resulting mixture being in the range upwardly from 1% to a proportion just short of the minimum matrix-forming proportion, and the total amount of water from the particles and the resin solution being in the range from about 35% to about 70% of the total weight, promptly conveying said mixed materials in a dehydrating gaseous environment at a temperature level between about 50° C. and about 200° C. for a time sufficiently long to heat and advance the resin and to reduce the moisture content of the material to at most 30% of the total, and sufficiently short to maintain the resulting resin in fusible thermosetting condition.

3. The process of claim 2 in which the turbulent mixture is formed in steam as the gaseous environment.

4. The process of claim 3 in which the gaseous environment is steam formed by discharging steam containing fibers through a pressure-reducing orifice from a region of higher-pressure steam.

5. The process of claim 4 in which the particles are separated from the steam and in which the dehydrating gaseous environment is heated air.

6. The process comprising forming a stream of cellulosic particles in an environment of steam, continuously introducing into said stream an aqueous solution of thermosetting phenol-formaldehyde resin, the proportion of resin solids to the oven-dry weight of the resulting mixture being in the range upwardly from 1% to a proportion just short of the minimum matrix-forming proportion, conveying said mixed materials in a vehicular environment of steam at a temperature level between about 100° C. and about 200° C. for a time sufficiently long to heat and advance the resin and sufficiently short to maintain the resulting advanced resin content in fusible and thermosetting condition, continuously conveying the resin-carrying particles in a vehicle of dehydrating gas which is substantially inert to the conveyed material and which is initially at a temperature level in the range from 50° C. to 200° C. for a time period sufficiently long to reduce the moisture content of the material to at most 30% of the total weight and sufficiently short to maintain the resulting resin in fusible thermosetting condition.

7. The process comprising continuously defibering cellulosic material in an environment of steam and forming a stream of defibered material in an environment of steam, continuously introducing into said stream an aqueous solution of thermosetting phenol-formaldehyde resin, the proportion of resin solids to the oven-dry weight of the resulting mixture being in the range upwardly from 1% to a proportion just short of the minimum matrix-forming proportion, conveying said mixed materials in a vehicular environment of steam at a temperature level between about 100° C. and about 200° C. for a time sufficiently long to heat and advance the resin and sufficiently short to maintain the resulting advanced resin content in fusible and thermosetting condition, continuously conveying the resin-carrying fibrous material in a vehicle of dehydrating gas which is substantially inert to the conveyed material and which is initially at a temperature level in the range from 50° C. to 200° C. for a time period sufficiently long to reduce the moisture content of the material to at most 30% of the total weight and sufficiently short to maintain the resulting resin in fusible thermosetting condition.

8. The process of claim 7 in which the cellulosic material is natural lignocellulose, whereby the resulting product contains substantially all the constituents of the material from which the fibers are derived.

9. The process of claim 8 in which the lignocellulose material is wood.

10. The process comprising continuously defibering lignocellulose in an environment of steam at superatmospheric pressure and at a temperature at which the lignin content is softened and forming a stream of defibered material in an environment of steam at a relatively lower temperature and pressure, continuously introducing into said stream an aqueous solution of thermosetting phenol-formaldehyde resin, the proportion of resin solids to the oven-dry weight of the resulting mixture being in the range upwardly from 1% to a proportion just short of the minimum matrix-forming proportion, conveying said mixed materials in a vehicular environment of steam at a temperature level between about 100° C. and about 200° C. and into a region of atmospheric pressure for a time sufficiently long to heat and advance the resin and sufficiently short to maintain the resulting advanced resin content in fusible and thermosetting condition, continuously conveying the resin-carrying fibrous material in a vehicle of dehydrating gas which is substantially inert to the conveyed material and which is initially at a temperature level in the range from 50° C. to 200° C. for a time period sufficiently long to reduce the moisture content of the material to at most 30% of the total weight and sufficiently short to maintain the resulting resin in fusible thermosetting condition.

11. The process of claim 10 in which the cellulosic material is natural lignocellulose, whereby the resulting product contains substantially all the constituents of the material from which the fibers are derived.

12. The process of claim 11 in which the lignocellulose material is wood.

13. A molding mixture comprising cellulosic particles carrying fusible thermosetting phenol-formaldehyde resin in an amount per 100 parts of oven-dry particles in the range from about one part to the critical matrix-forming amount of about 35 parts, the particles having moisture in amount not more than about 30% of the total weight, substantially all the resin being on the surfaces of the particles and being fusible and thermosetting.

14. The product of claim 13 in which the cellulosic particles are fibers derived from wood.

15. The product of claim 14 in which the fibers consist of substantially all the solid content of the wood from which the fibers are derived.

16. The process of claim 6 in which the particles are separated from the vehicular environment of steam and in which the dehydrating gas is initially heated air.

17. The process of claim 7 in which the particles are separated from the vehicular environment of steam and in which the dehydrating gas is initially heated air.

18. The process of claim 10 in which the particles are separated from the vehicular environment of steam and in which the dehydrating gas is initially heated air.

References Cited in the file of this patent

UNITED STATES PATENTS

| | | |
|---|---|---|
| 2,101,635 | Bender | Dec. 7, 1937 |
| 2,150,148 | Bowen et al. | Mar. 14, 1939 |
| 2,516,847 | Boehm | Aug. 1, 1950 |
| 2,553,412 | Heritage | May 15, 1951 |